(12) United States Patent
Kao et al.

(10) Patent No.: US 12,346,285 B2
(45) Date of Patent: Jul. 1, 2025

(54) DIAGONAL TORUS NETWORK

(71) Applicant: TAIWAN SEMICONDUCTOR MANUFACTURING COMPANY, LTD., Hsinchu (TW)

(72) Inventors: Jerry Chang Jui Kao, Taipei (TW); Huang-Yu Chen, Zhudong Township (TW); Yung-Chen Chien, Kaohsiung (TW); Tzu-Ying Lin, Hsinchu (TW); Wei-Hsiang Ma, Taipei (TW); Chung-Hsing Wang, Baoshan Township (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 352 days.

(21) Appl. No.: 17/461,225

(22) Filed: Aug. 30, 2021

(65) Prior Publication Data
US 2023/0066045 A1 Mar. 2, 2023

(51) Int. Cl.
*G06F 15/80* (2006.01)
*G06F 15/17* (2006.01)
*G06F 15/173* (2006.01)

(52) U.S. Cl.
CPC ........ *G06F 15/17381* (2013.01); *G06F 15/17* (2013.01); *G06F 15/17306* (2013.01)

(58) Field of Classification Search
CPC .............. G06F 15/17381; G06F 15/17; G06F 15/17305
See application file for complete search history.

(56) References Cited

U.S. PATENT DOCUMENTS

| | | | | |
|---|---|---|---|---|
| 6,167,502 | A * | 12/2000 | Pechanek | G06F 15/8023 712/15 |
| 7,027,413 | B2 * | 4/2006 | Lee | G06F 15/17337 370/386 |
| 10,693,767 | B2 * | 6/2020 | Oprea | H04L 45/40 |
| 11,183,262 | B2 * | 11/2021 | Li | G11C 29/42 |

(Continued)

OTHER PUBLICATIONS

Yang et al., "Recursive Diagonal Torus: An Interconnection Network for Massively Parallel Computers", Jul. 2001, IEEE (Year: 2001).*

(Continued)

*Primary Examiner* — Hyun Nam
(74) *Attorney, Agent, or Firm* — Sterne, Kessler, Goldstein & Fox P.L.L.C.

(57) ABSTRACT

A device is disclosed that includes multiple channels and multiple processing nodes. Each processing node includes input/output (I/O) ports coupled to the channels and channel control modules coupled to the I/O ports. Each processing node is configured to select, by the channel control module in a first operation, a first I/O port of the I/O ports; communicate a first message, via the first I/O port, to a first processing node over a first channel or a second processing node over a second channel orthogonal to the first channel in a logic representation; select, by the channel control module in a second operation, a second I/O port of the I/O ports; and communicate a second message, via the second I/O port, to a third processing node over a third channel extending in a diagonal direction and non-orthogonal to the first and second channels in the logic representation.

20 Claims, 9 Drawing Sheets

(56) References Cited

U.S. PATENT DOCUMENTS

| | | | | |
|---|---|---|---|---|
| 2002/0018448 | A1* | 2/2002 | Amis | H04L 41/0893 370/255 |
| 2013/0019082 | A1* | 1/2013 | Pechanek | G06F 15/8023 712/16 |
| 2014/0098702 | A1* | 4/2014 | Fricker | G06F 9/44 370/254 |
| 2014/0244706 | A1* | 8/2014 | Zhang | G06F 15/17387 709/201 |
| 2014/0281377 | A1* | 9/2014 | Davis | G06F 15/80 712/29 |
| 2014/0371110 | A1* | 12/2014 | Van Rooyen | H01L 21/768 438/618 |
| 2015/0331807 | A1* | 11/2015 | Lie | G06F 12/1063 711/118 |
| 2021/0327528 | A1* | 10/2021 | Li | G11C 29/1201 |
| 2024/0146805 | A1* | 5/2024 | Choi | G06F 13/4022 |

OTHER PUBLICATIONS

Mostafa Abd-El-Barr and Turki F. Al-Somani, "Topological Properties of Hierarchical Interconnection Networks: A Review and Comparison", Feb. 2011 (Year: 2011).*

Mostafa et. al, "Topological Properties of Hierarchical Interconnection Networks", 2011 (Year: 2011).*

* cited by examiner

Diagonal Torus Network on Chip

Ring Style on-chip interconnect

Diagonal-route Ring-Style on-chip interconnect

DIAGONAL TORUS NETWORK

BACKGROUND

Advances in microelectronics have enabled the continued increase in transistor densities for a variety of integrated circuit (IC) devices. IC devices, such as field programmable gate arrays (FPGAs) and other programmable logic devices, can include an increasing number of transistors and a wide variety of programmable circuit designs to implement many growing functions. The ever-increasing number of functions increases the complexity of IC designs.

BRIEF DESCRIPTION OF THE FIGURES

Aspects of this disclosure are best understood from the following detailed description when read with the accompanying figures.

Figure 1:
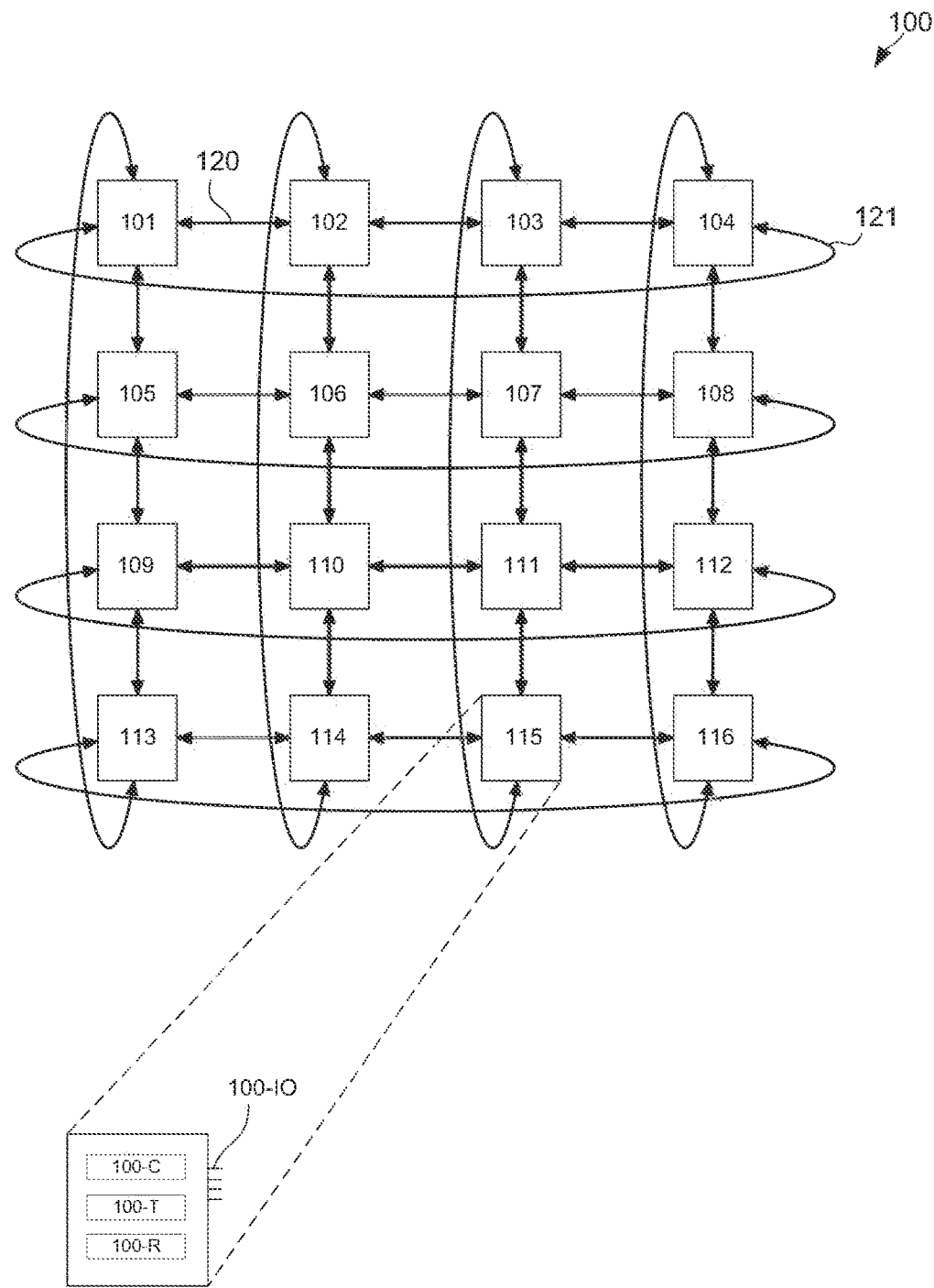
FIG. 1 is an illustration of a mesh to route communications, according to some embodiments.

Illustrative embodiments will now be described with reference to the accompanying drawings. In the drawings, like reference numerals generally indicate identical, functionally similar, and/or structurally similar elements. The discussion of elements with the same annotations applies to each other, unless mentioned otherwise.

DETAILED DESCRIPTION

The following disclosure provides many different embodiments, or examples, for implementing different features of the provided subject matter. Specific examples of components and arrangements are described below to simplify the present disclosure. These are merely examples and are not intended to be limiting.

In some programmable logic devices, such as a System on Chip (SoC) device, data may be packetized and routed using data-transfer protocols over a fixed interconnect network circuit, such as a Network on Chip (NoC). However, due to ever-increasing processing requirements, bandwidth requirements of certain applications and protocols can place strain on the NoC. A limiting characteristic in the NoC can be throughput. If the NoC is limited with respect to channels per device, then it may not have a sufficient bandwidth to accommodate certain applications and/or protocols. In some cases, if a circuit design requires or utilizes bandwidth smaller than the bandwidth of the NoC, then the NoC may have an inefficient design and increased power consumption. A NoC may be characterized by performance deficiencies attributed to a limited number of channels coupled to individual processing nodes. Such limitations can impair bandwidth.

Embodiments described herein are directed to improving routing in devices, such as NoCs. According to some embodiments, a diagonal routing mesh overlaid with a grid mesh in a communications device is disclosed. For example, a device, such as a NoC, can include a horizontal/vertical mesh (such as in a logic representation) having an additional overlay diagonal mesh to route communications. The mesh can include processing nodes coupled to multiple channels, where one or more channels extend in a direction (such as a diagonal direction) that is not orthogonal or parallel to the other channels.

According to some embodiments, a processing node in a diagonal grid or torus arrangement selects a port and communicates a message in a first horizontal or vertical direction. The channel control module circuitry selects a port and communicates a message in a channel that extends in a second non-orthogonal, diagonal direction.

FIG. 1 illustrates a mesh 100 that may be used to route communications. For example, mesh 100 can be used to route communications in a device, such as a NoC device. In some embodiments, mesh 100 can be incorporated in a NoC of a SoC device.

Mesh 100 includes processing nodes (e.g., routers) 101 to 116 and channels 120 and 121. In some embodiments, such as in a SoC device, each processing node can be coupled to one or more cores (not shown).

As shown in FIG. 1, each processing node 101 to 116 can have an arrangement that may include input/output (I/O) ports 100-IO, one or more channel control modules 100-C, one or more transceiver modules 100-T, and one or more receiver modules 100-R. Additionally, channel control module 100-C can be coupled to transceiver module 100-T and receiver module 100-R to control communications transmitted and received via one or more channels 120. In some embodiments, I/O ports 100-IO can be coupled to channels 120. For example, each of I/O ports 100-IO can be coupled to one or more channels 120.

In some embodiments, channel control module 100-C determines or selects one or more I/O port 100-IO for a communication operation, such as communicating a message. FIG. 1 shows a logic representation for mesh 100, which is a high level, abstracted depiction of elements of an interconnected network. The logic representation does not necessarily correspond to a physical placement of the elements but demonstrates a topology to demonstrate how data flows in an interconnected network. In the logic representation shown in FIG. 1, channels 120 and 121 of mesh 100 extend in either a horizontal (e.g., along an x-axis) or vertical direction (e.g., along a y-axis) of a grid arrangement. As shown in FIG. 1, channels 121 can be edge channels, e.g., channels that can traverse from one edge (of the logical representation) to an opposing edge. Further, terminal processing nodes (e.g., 101 to 104) on one edge of mesh 100 are connected by respective channels 120 to terminal processing nodes (e.g., 113 to 116) on an opposing edge, forming a torus. For example, processing node 101 on an edge of mesh 100 is directly connected to processing node 113 on an opposing edge by one of channels 121.

Therefore, in some embodiments, processing nodes 101 to 116 are each configured to communicate a message directly to two horizontally-disposed neighbors and two vertically-disposed neighbors. For example, processing node 101 is configured to communicate directly to processing nodes 102, 104, 105, and 113 via channels 120 arranged in the horizontal/vertical grid. Mesh 100 may be reconfigurable (e.g., FPGA) or may be an application-specific integrated circuit (ASIC). A user may implement a circuit design to be programmed onto an integrated circuit using design software to form mesh 100.

Figure 2:
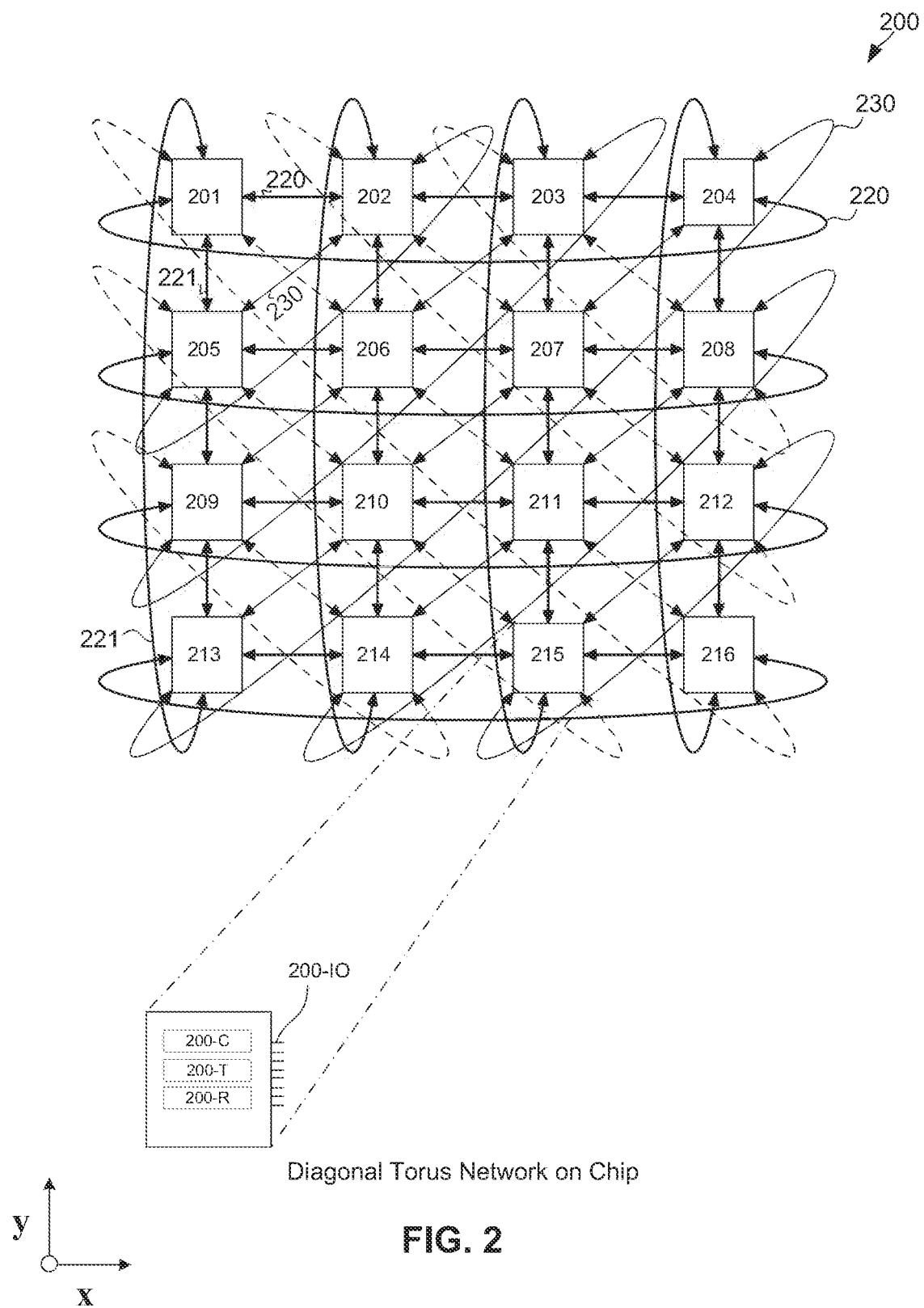
FIG. 2 is an illustration of a mesh to route communications, including a diagonal mesh, according to some embodiments.

FIG. 2 illustrates a mesh 200 having an additional overlay diagonal mesh that may be used to route communications in a device, such as a NoC device, and can be incorporated in a SoC device.

Mesh 200 includes processing nodes 201 to 216 and channels 220 and 221. As shown in FIG. 2, mesh 200 includes vertical (e.g., along a y-axis) channels 220, horizontal (e.g., along an x-axis) channels 221, and channels 230 that extend in a diagonal direction (e.g., relative to the horizontal and vertical directions).

In some embodiments, each processing node 201 to 216 can have an arrangement that may include I/O ports 200-IO, one or more channel control modules 200-C, one or more transceiver modules 200-T, and one or more receiver modules 200-R. In each processing node 201 to 216, I/O ports 20040 can be coupled to channels 220. For example, each of I/O ports 20040 can be coupled to one or more channels 220.

In some embodiments, channel control module 200-C determines or selects one or more I/O port 200-IO for a communication operation, such as communicating a message. In the logic representation shown in FIG. 2, channels 220 of mesh 200 extend in either a horizontal (e.g., along an x-axis) or vertical (e.g., along a y-axis) direction of a grid arrangement, while channels 230 extend in diagonal direction. For example, each of channels 230 are non-orthogonal to channels 220 and 221.

In some embodiments, in a first operation, channel control module 200-C of a processing node (e.g., processing node 203) can select one or more I/O ports 200-IO and communicate a first message to one or more processing nodes (e.g., first processing node, such as processing node 202 or 204) over a first channel 220/221 or one or more other processing nodes (e.g., processing node 207 or 215) over a second channel 220/221 orthogonal to first channel 220/221, as shown in a logic representation.

In a second operation, channel control module 200-C of processing node 203 can select another I/O port 200-IO and communicate a second message to a third processing node (e.g., processing node 206, 208, or 209) over a third channel 230 extending in a diagonal direction and non-orthogonal to first and second channels 220/221 in the logic representation.

Figure 3:
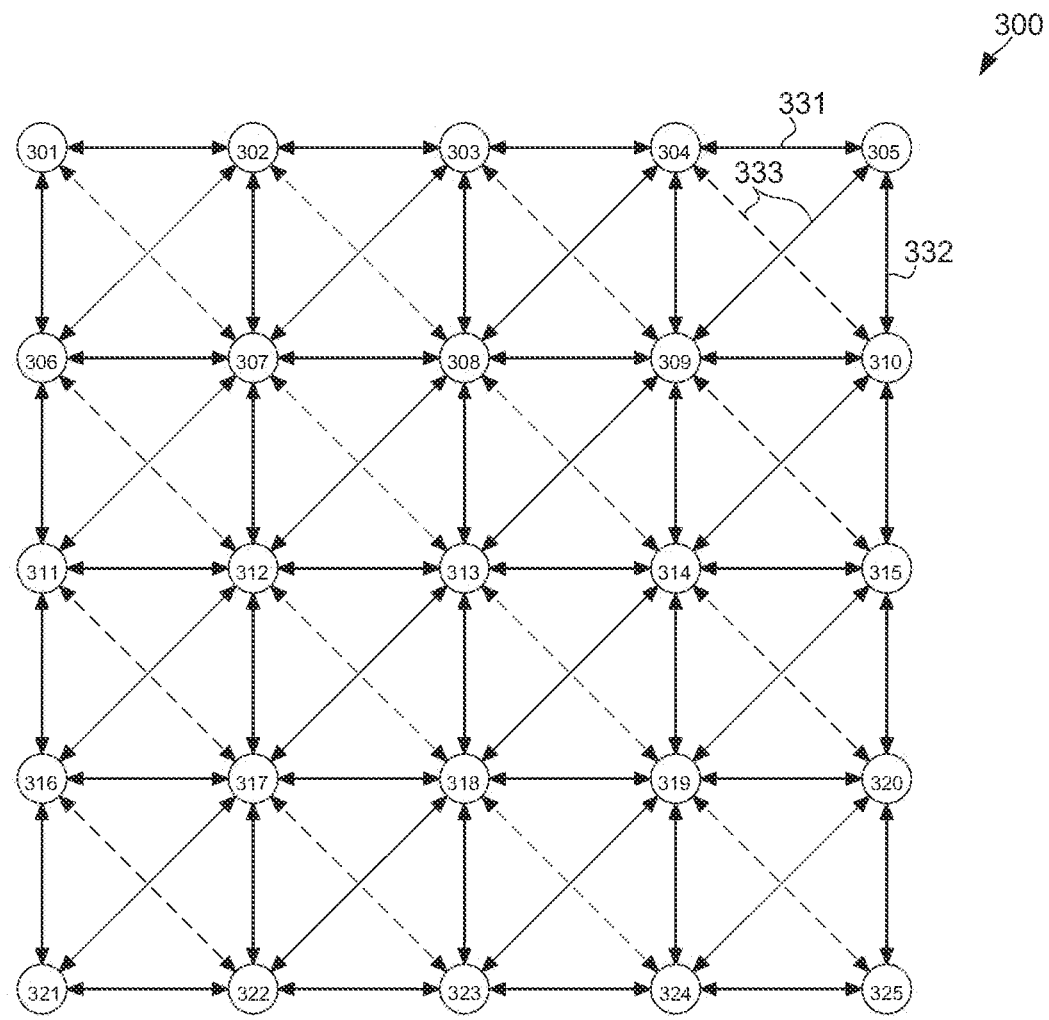
FIG. 3 is an illustration of a diagonal-grid mesh to route communications, according to some embodiments.
Figure 3:
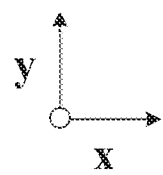

FIG. 3 illustrates another example of diagonal routing in a mesh 300, according to some embodiments. Mesh 300 includes processing nodes 301 to 325, horizontal channels 331, vertical channels 332, and diagonal channels 333.

Specifically, mesh 300 includes a first routing mesh including one or more horizontal channels 331 which extend in a horizontal (e.g., along an x-axis) direction in a logic representation. Mesh 300 further includes a second routing mesh including one or more vertical channels 332, extending in a vertical (e.g., along a y-axis) direction. Further, mesh 300 includes a third routing mesh with diagonal channels 333 extending in the diagonal direction (e.g., relative to horizontal and vertical directions).

In some embodiments, each processing of node 301 to 325 can include I/O ports 200-IO. In some embodiments, processing nodes 301 to 325 can each include eight or more I/O ports coupled to one or more channels. For example, processing node 308 can include eight I/O ports, two of which are coupled to horizontal channels of first routing mesh 331, two of which are coupled to vertical channels second routing mesh 332, and four of which are coupled to diagonal channels of third routing mesh 333.

Mesh 300 provides a system that overlays interior diagonal routings on a grid-based mesh system. Arranging diagonal routing (e.g., diagonal channels 333) in mesh 300 permits higher bandwidth networks, devices, and methodologies to optimize communication performance. For example, coupling each processing node 301 to 325 with increased channels (e.g., five, six, seven, eight or more channels) permits shortening transmission line (e.g., channel) distance between processing nodes. As a result, transmission latency is reduced. Further, by adding the diagonal mesh to overlay a grid mesh, one or more processing nodes can be bypassed with substantial efficiency (e.g., to avoid a processing node that malfunctions, delays operation, etc.).

As described above, FIG. 1 illustrates a grid-based mesh 100 having an arrangement suitable for a particular system. That is, mesh 100 can be suitable for a system with a particular number of I/O ports 10040 and channels 120/121 and particular processing requirements for channel control module 100-C. Embodiments of FIGS. 2 and 3 can provide a diagonal mesh overlay that achieves higher throughput and bandwidth than grid-based mesh 100 due to, among other things, reduced transmission line distance.

Figure 4:
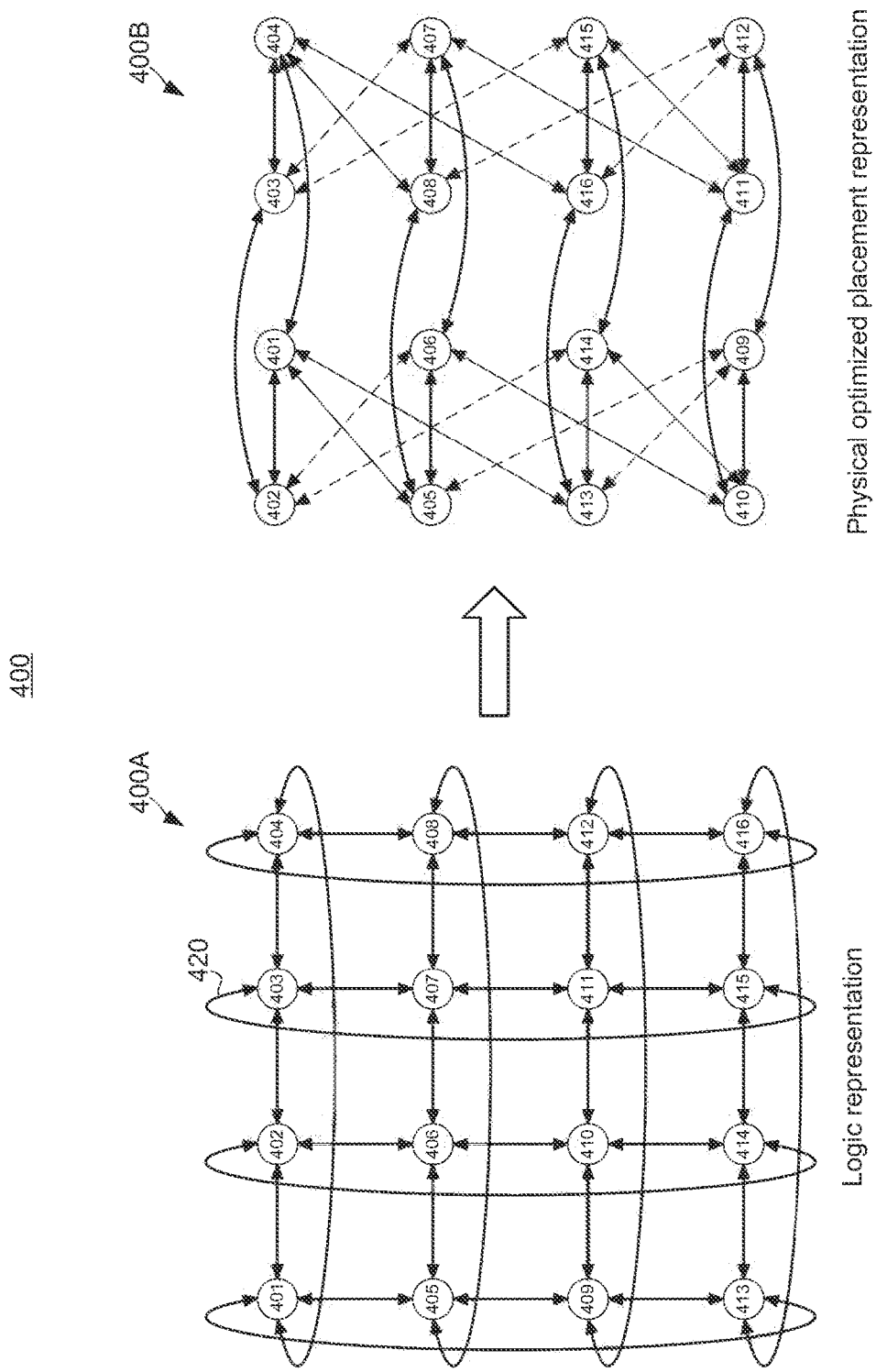
FIG. 4 is an illustration of a grid mesh in a logic representation and a physical optimized placement representation, according to some embodiments.

FIG. 4 illustrates a grid mesh 400A (in a logic representation) utilizing a diagonal routing mesh 400B (in a physical representation), according to some embodiments. FIG. 4 shows a physical representation for mesh 400B, which illustrates physical placement and routing of interconnected nodes, wires and cables. Mesh 400A and mesh 400B include processing nodes 401 to 416 and channels 420. By implementing the physical diagonal routing mesh 400B, physical processing node placement can be optimized. Physical diagonal routing mesh 400B can be an embodiment of mesh 200 or mesh 300. For example, as with the embodiment of mesh 200, each processing node 401 to 416 can have an arrangement that may include I/O ports 20040, one or more channel control modules 200-C, one or more transceiver modules 200-T, and one or more receiver modules 200-R. In each processing node 201 to 216, I/O ports 20040 can be coupled to a plurality of channels 531-534.

That is, based on the grid-based mesh, one or more physical connections may be swapped, rearranged, or reconfigured to achieve a reduction of transmission line length. For example, in mesh 400A a transmission path from processing node 413 to 416 can require a long transmission line length (e.g., 3 hops: from 413 to 414, from 414 to 415, and from 415 to 416). By rearranging the physical placement of processing nodes 401 to 416 and channels 420, the transmission line length can be reduced. In some embodiments, in mesh 400B and with an optimized physical placement, the transmission line length from processing node 404 to processing node 416 is reduced to 2.4n, where n represents a distance between nodes equally spaced in corresponding mesh 400A.

As shown in mesh 400A and corresponding mesh 400B, a network can be optimized for a system with a particular number of I/O ports 100-IO and channels 120/121 and particular processing requirements for channel control module 100-C. Thus, physically rearranging processing node placement based on a diagonal routing methodology can allow shorter transmission distances, thus further leveraging the diagonal routing methodology.

Figure 5:
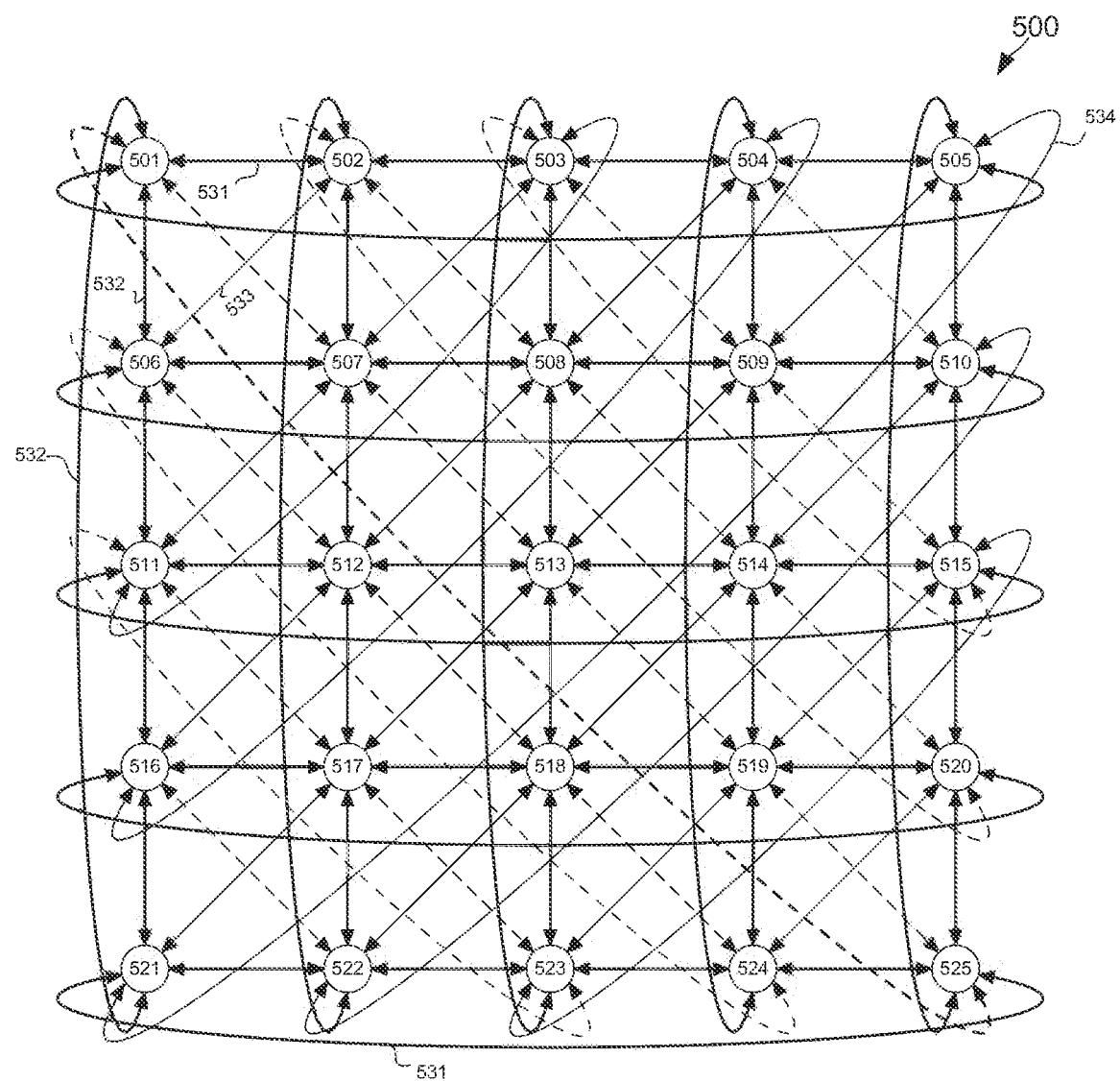
FIG. 5 is an illustration of a diagonal-grid torus to route communications, according to some embodiments.
Figure 5:
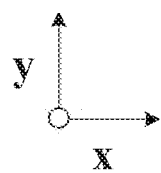

FIG. 5 illustrates a diagonal torus mesh 500, according to some embodiments. The diagonal torus refers to the interconnection of edge processing nodes that can be represented by a torus and that achieves increased bandwidth compared to a grid-based torus. Diagonal torus mesh 500 can be used to route communications in a device, such as a NoC incorporated in a SoC device.

A torus network can achieve higher throughput than other grid-style networks, because the torus network has additional wrap-around channels at the edges and at corners of the network. These wrap-around, or edge, channels can reduce the number of hops between processing nodes situated on edges. For example, as shown by diagonal torus mesh 500 in FIG. 5, a transmission path between processing nodes is a maximum of two hops (or nodes) away. For example, communication between a processing node in an upper left corner (e.g., processing node 501) and a processing node in a lower right corner (e.g., processing node 525) can be achieved in two hops, as compared to a greater number of hops (e.g., four vertical and four horizontal hops) required in other grid arrangements. Thus, arranging processing nodes in a torus network increases bandwidth.

In FIG. 5, non-orthogonal routing systems are applied, such as diagonal routes (e.g., 45 degrees) allowing increased throughput and bandwidth.

Diagonal torus mesh 500 includes processing nodes 501 to 525 and channels 531 to 534. As shown in FIG. 5, channels 531 extend in horizontal (e.g., along an x-axis) directions, channels 532 extend in vertical (e.g., along a y-axis) directions, and channels 533 and edge channels 534 extend in a diagonal direction (e.g., relative to the horizontal and vertical directions).

Diagonal torus mesh 500 can be an embodiment of mesh 200 or mesh 300. For example, as with the embodiment of mesh 200, each processing node 501 to 525 can have an arrangement that may include I/O ports 200-IO, one or more channel control modules 200-C, one or more transceiver modules 200-T, and one or more receiver modules 200-R. In each processing node 501 to 525, I/O ports 200-IO can be coupled to a plurality of channels 531 to 534.

In each processing node 501 to 525, I/O ports 200-IO can be coupled to channels 531-534. For example, each of I/O ports 200-IO can be coupled to one or more channels 531-534.

In some embodiments, channel control module 200-C determines or selects one or more I/O port 200-IO for a communication operation, such as communicating a message. In the logic representation shown in FIG. 5, channels 531 and 532 of mesh 500 extend in either a horizontal or vertical direction of a grid arrangement, while channels 533 and 534 extend in diagonal direction. For example, each of channels 533 and 534 is non-orthogonal to channels 531 and 532.

Further, terminal processing nodes (e.g., 501 to 505) on one edge of mesh 500 are connected by respective channels 531/532 in a torus-routing methodology to terminal processing nodes (e.g., 521 to 525) on an opposing edge, as in FIG. 1, as well as diagonally-opposing edges (e.g., 505, 510, 515, 520, and 525) by channels 534, forming a diagonal torus. Therefore, in some embodiments, processing nodes 501 to 525 are each configured to communicate a message directly to two horizontally-disposed neighbors, two vertically-disposed neighbors, and multiple (e.g., two to four) diagonally-disposed neighbors.

In some embodiments, in a first operation, channel control module 200-C of a processing node (e.g., processing node 503) can select one or more I/O ports 200-IO and communicate a first message to one or more processing nodes (e.g., a first processing node, such as processing node 502 or 504) over a first channel 531/532 or one or more other processing nodes (e.g., second processing node, such as processing node 508 or 523) over a second channel 531/532 orthogonal to first channel 531/532, as shown in a logic representation.

In a second operation, channel control module 200-C of processing node 503 can select an I/O port 200-IO and communicate a second message to a third processing node (e.g., processing node 507, 509, 511, or 515) over a third channel 533/534 extending in a diagonal direction and non-orthogonal to first and second channels 531/532 in the logic representation.

Figure 6:
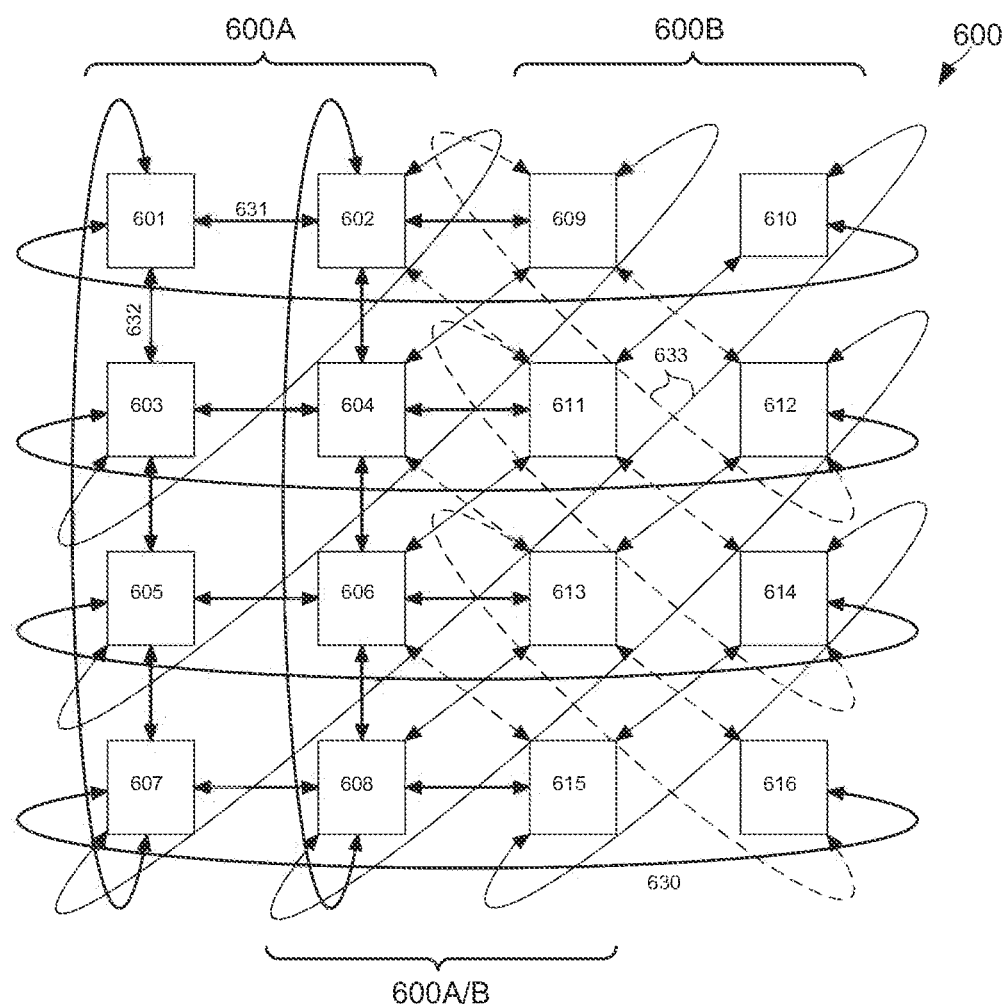
FIG. 6 is an illustration of a mixed mesh to route communications, according to some embodiments.
Figure 6:
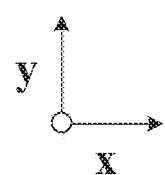

FIG. 6 illustrates a mixed (grid/diagonal) torus 600 that includes a first mesh 600A and a second mesh 600B, according to some embodiments. A portion of mixed torus 600 includes diagonal routing.

First mesh 600A omits diagonally-routed channels and includes only channels that are parallel or orthogonal to one another, according to some embodiments. Second mesh 600B does not include horizontally- and vertically-routed channels and includes only diagonally-routed channels, according to some embodiments. Channels 631 and 632 of first mesh 600A are not orthogonal or parallel to channels 633 of second mesh 600B.

First mesh 600A includes processing nodes 601 to 608, channels 631 extending in a horizontal direction (e.g., along an x-axis), and channels 632 extending in a vertical direction (e.g., along a y-axis). Second mesh 600B includes processing nodes 609 to 616 and channels 633 extending in a diagonal direction (e.g., relative to the horizontal and vertical directions). In some embodiments, each processing node can have an arrangement that may include I/O ports 20040, one or more channel control modules 200-C, one or more transceiver modules 200-T, and one or more receiver modules 200-R.

In some embodiments, first mesh 600A and second mesh 600B meet at an interface mesh 600A/B, where processing nodes (e.g., 602, 604, 606, 608, 609, 611, 613, and 615) that occur in the interface mesh 600A/B can have an increased number of I/O ports to accommodate higher bandwidth requirements and are coupled to channels 631 to 633. In each of these processing nodes, I/O ports 200-IO can be coupled to channels 631, 632, and/or 633.

Mixed torus 600 can be advantageous in heterogeneous computer systems, processing systems, networking systems, memory systems, etc. An embodiment of mixed torus 600 can include a multi-core system, one or more portions 600A and/or 600B can be implemented with one or more cores (e.g., processing nodes 601, 603, 605, and 607) having a particular resource availability and one or more cores (e.g., processing nodes 602, 604, 606, and 608) having greater resource availability, higher bandwidth, and improved performance.

In some embodiments, channel control module 200-C determines or selects one or more I/O port 200-IO for a communication operation, such as communicating a message. In the logic representation shown in FIG. 6, channels 631 and 632 of mesh 600 extend, respectively, in a horizontal and vertical direction of a grid arrangement, while channels 633 extend in diagonal direction. For example, each of channels 633 are non-orthogonal to channels 631 and 632. Further, as in FIG. 6, terminal processing nodes (e.g., processing nodes 610, 612, 614, and 616) on one edge of mesh 600 are connected by respective channels 630 to terminal processing nodes (e.g., processing nodes 601, 603, 605, and 607) on an opposing edge, as well as diagonally-opposing edges (e.g., processing nodes 607, 608, and 615) forming a partial diagonal torus.

In some embodiments, in a first operation in first mesh 600A, channel control module 200-C of a processing node (e.g., processing node 601) can select one or more I/O ports 200-IO from a reduced number of I/O ports and communicate a first message to one or more processing nodes (e.g., first processing node, such as processing node 610) over a first channel 630 or 631 or one or more other processing nodes (e.g., second processing node such as processing node 603) over a second channel 630 or 632 orthogonal to first channel 630/631, as shown in the logic representation in FIG. 6.

In a second operation in second mesh 600B, channel control module 200-C of second processing node 610 can select an I/O port 200-IO from a reduced number of I/O ports and communicate a second message to a third processing node (e.g., processing node 611) over a third channel 633 extending in a diagonal direction and non-orthogonal to first and second channels 630/631 in the logic representation in FIG. 6.

In a third operation, in interface mesh 600A/B, channel control module 200-C of third processing node 611 can select an I/O port 200-IO from a number of I/O ports, which can be an increased number of I/O ports to accommodate higher bandwidth requirements, for example, in a heterogeneous system. The third processing node 611 can then communicate a third message to a fourth processing node (e.g., processing node 606) over a fourth channel (e.g., channel 633) extending in a diagonal direction and non-orthogonal to first and second channels 630-632 in the logic representation. Or, third processing node 611 can communicate the third message to a fourth processing node 604 over a fourth channel (e.g., channels 630-632). Thereby, heterogeneous systems can be implemented with mixed meshes, such as mixed torus 600 having a lower bandwidth first mesh 600A, and a higher bandwidth interface mesh 600A/B. Thus, mixed torus 600 is arranged to perform operations characterized by diversified throughput.

Figure 7:
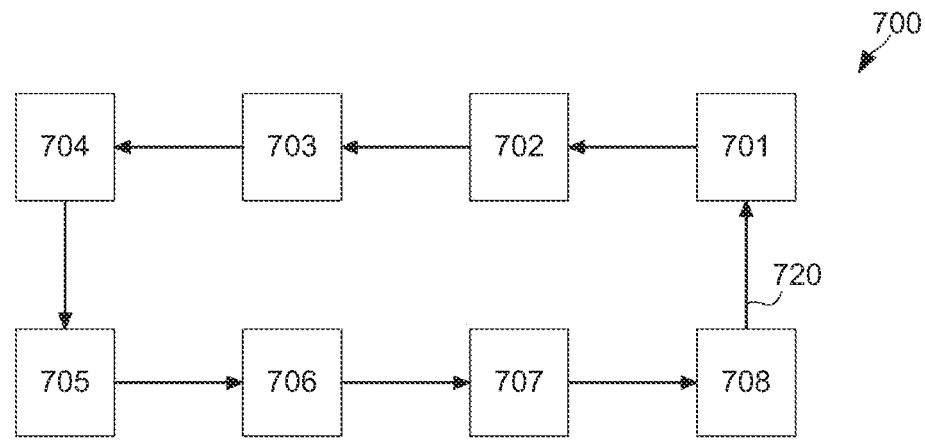
FIG. 7 is an illustration of a ring-route interconnect and a diagonal-route ring interconnect, according to some embodiments.
Figure 7:
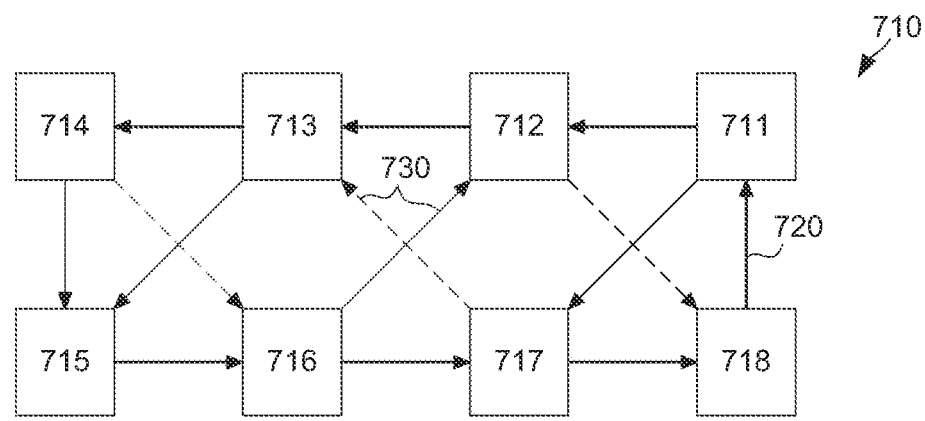
Figure 7:
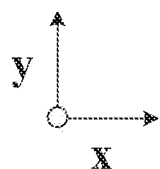

According to still other embodiments, exemplary ring-route communication networks can be achieved and optimized by diagonal routing systems and methodologies. FIG. 7 illustrates a ring-route mesh 700 that may be used to route communications in a device, such as a ring style on-chip interconnect device or on-chip interconnection network (OCIN), according to some embodiments. In some embodiments, ring-route mesh 700 can be incorporated in an on-chip interconnect device of a SoC device.

Ring-route mesh 700 includes processing nodes 701 to 708 and channels 720. Each processing node 701 to 708 can have an arrangement that may include I/O ports 10040, one or more channel control modules 100-C, one or more transceiver modules 100-T, and one or more receiver modules 100-R. Each of I/O ports 10040 can be coupled to one or more of channels 720.

In some embodiments, channels 720 of ring-route mesh 700 permit unidirectional communication. For example, processing node 701 is configured to transmit a message in one direction to processing node 702 via one unidirectional channel 720. Processing node 701 is configured to receive a message from one direction via another unidirectional channel 720.

In some embodiments, channel control module 100-C determines or selects one or more I/O port 10040 for a communication operation, such as communicating a message. Unidirectional channels 720 of ring-route mesh 700 extend in either a horizontal (e.g., along an x-axis) or vertical (e.g., along a y-axis) direction of a ring-route arrangement. Therefore, in some embodiments, processing nodes 701 to 708 are each configured to communicate a message directly to only one neighbor and from only one other neighbor according to some embodiments.

Arranging one or more processing nodes 701 to 708 in a ring-route mesh, such as ring-route mesh 700, can reduce processing requirements of each processing node. Since each processing node is only required to send or receive via a single I/O port and channel, a network can be provided having particular routing resource requirements, according to some embodiments.

In some embodiments, a diagonal ring-route mesh 710 can be implemented in a device, such as a diagonal-routed ring style on-chip interconnect device or OCIN. In some embodiments, diagonal ring-route mesh 710 can be incorporated in an on-chip interconnect device of a SoC device.

Diagonal ring-route mesh 710 includes processing nodes 711 to 718, channels 720, and channels 730 that arc not orthogonal to channels 720. Each processing node 711 to 718 can have an arrangement that may include I/O ports 100-IO, one or more channel control modules 100-C, one or more transceiver modules 100-T, and one or more receiver modules 100-R. I/O ports 100-IO in each processing node 711 to 718 can be coupled to one or more of channels 720/730.

Diagonal ring-route mesh 710 includes ring-route mesh 700, e.g., channels 720 permitting each processing node 711 to 718 to perform unidirectional communication with a first processing node 711 to 718. For example, processing node 711 can transmit a message to (first) processing node 712 via channel 720, or receive a message from (first) processing node 718. Diagonal ring-route mesh 710 includes channels 730, extending in a non-orthogonal, diagonal direction relative to channels 720. Each processing node 711 to 718 can thereby perform unidirectional communication with a second processing node 711 to 718 via channels 730. For example, supplementing the unidirectional communication of ring-route mesh 700, processing node 711 additionally can transmit a message to processing node 717 via channel 730.

In one example, channel control module 100-C of processing node 716 determines or selects an I/O port 100-IO for a communication operation, such as communicating a message in a first mesh (e.g., mesh 700). Processing node 716 communicates a first message, via the I/O port, with a first processing node (e.g., processing node 715 or 717) over a first or second channel 720. In some embodiments, second channel 720 is orthogonal to first channel 720 in a logic representation. In some embodiments, second channel 720 is parallel to first channel 720.

According to some embodiments, channel control module 100-C of processing node 716 selects an I/O port. Processing node 716 communicates a second message, via the I/O port, with a second processing node (e.g., processing node 712 or 714) over a third channel 730 extending in a non-orthogonal direction relative to first and second channels 720 in the logic representation in FIG. 7. As discussed above, first and second channels 720 are arranged for unidirectional communication in a ring route, supplemented by third (diagonal) channels 730 of a diagonal ring-route mesh 710.

Arranging processing nodes and channels in diagonal ring-route mesh 710 can reduce latency, while maintaining a resource-friendly system that uses particular routing resources. For example, where a transmission from processing node 705 to processing node 703 of ring-route mesh 700 requires six hops, a transmission from corresponding processing nodes 715 to 713 of diagonal ring-route mesh 710 requires two hops, improving communication latency.

Arranging processing nodes and channels in diagonal ring-route mesh 710 can also allow one or more malfunctioning or delayed processing nodes to be bypassed as necessary to accommodate efficient operation of the communication network, such as the diagonal-routed ring style on-chip interconnect device or OCIN.

Figure 8:
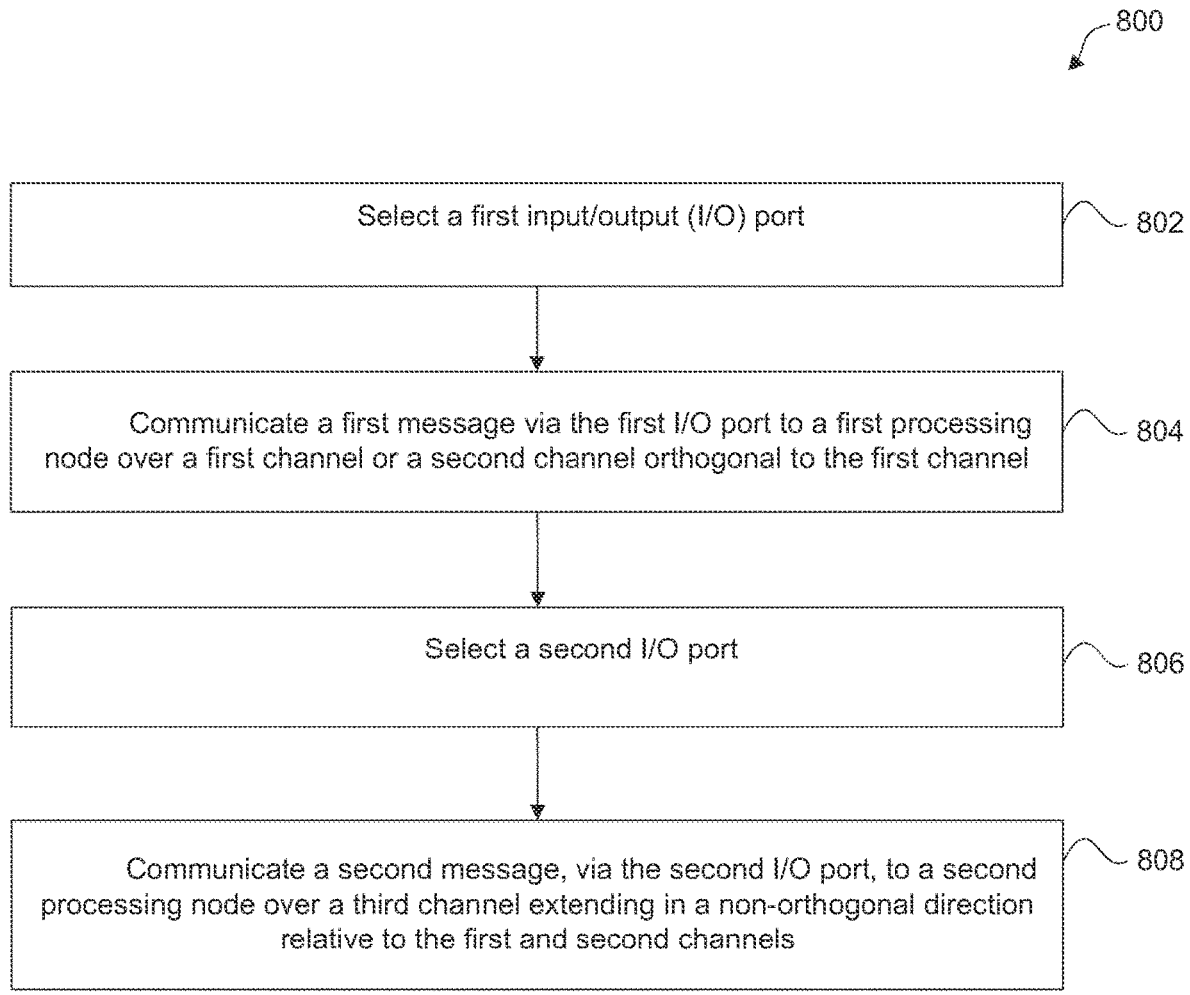
FIG. 8 is a flow diagram of a method for communications in a diagonal mesh or torus system, according to some embodiments.

FIG. 8 is a flow diagram of a method 800 that performs communications in a communications network, such as in a NoC, a diagonal ring-style on-chip interconnect, a heterogeneous system, etc. In some embodiments, method 800 performs communication operations in a diagonal mesh. In some embodiments, method 800 performs communication operations in a diagonal torus.

Referring to FIG. 8, at operation 802, a channel control module of a processing node selects an I/O port. For example, channel control module 200-C determines or selects one or more I/O port 200-IO for a communication operation, such as communicating a first message. The selection can be based on a determination of a shortest route to a destination processing node. In some embodiments, the determination can be based on throughput availability, a number of hops to the destination, and other routing considerations.

At operation 804, the processing node communicates a first message, via the selected I/O port, to a first processing node over a first channel or a second channel orthogonal to the first channel in a logic representation. For example, as shown in FIG. 5, the processing node can communicate a message by channels 531 and 532 of mesh 500 that extends in either a horizontal or vertical direction of a grid arrangement.

In some embodiments, in a first operation, channel control module 200-C of a processing node (e.g., processing node 503) can select one or more I/O ports 200-IO and communicate a first message to one or more processing nodes (e.g., a first processing node, such as processing node 502 or 504) over a first channel 531/532 or one or more other processing nodes (e.g., a second processing node, such as processing node 508 or 523) over a second channel 533/534 orthogonal to first channel 531/532.

As noted above, in a torus system such as mesh 500, terminal processing nodes (e.g., processing nodes 501 to 505) on an edge of mesh 500 are connected by respective channels 531/532 in a torus-routing methodology to terminal processing nodes (e.g., 521 to 525) on an opposing edge. Therefore, at operation 804, the processing node can communicate a message directly to two horizontally-disposed neighbors, or two vertically-disposed neighbors.

At operation 806, a channel control module of a processing node selects an I/O port. For example, channel control module 200-C determines or selects one or more I/O ports 200-IO for a communication operation, for communicating a second message. The selection can be based on similar determinations as 802.

At operation 808, the processing node communicates a second message, via the I/O port (e.g., the I/O port selected at 806), to a second processing node over a third channel extending in a non-orthogonal direction relative to the first and second channels. In some embodiments, the processing node can communicate a message by channels 533 and 534 that extend in a diagonal direction and are non-orthogonal to channels 531 and 532.

For example, channel control module 200-C of processing node 503 can select an I/O port 200-IO and communicate a second message to a third processing node (e.g., processing node 507, 509, 511, or 515) over a third channel 533/534 extending in a diagonal direction and non-orthogonal to first and second channels 531/532 in the logic representation. In some embodiments, a second message may be communicated in a diagonal torus arrangement, such as a diagonal torus 500. In a diagonal torus, similar to 804, diagonally-opposing edges are interconnected. In some embodiments, the processing node can reach multiple (e.g., four) diagonally-disposed neighbors at operation 808.

Figure 9:
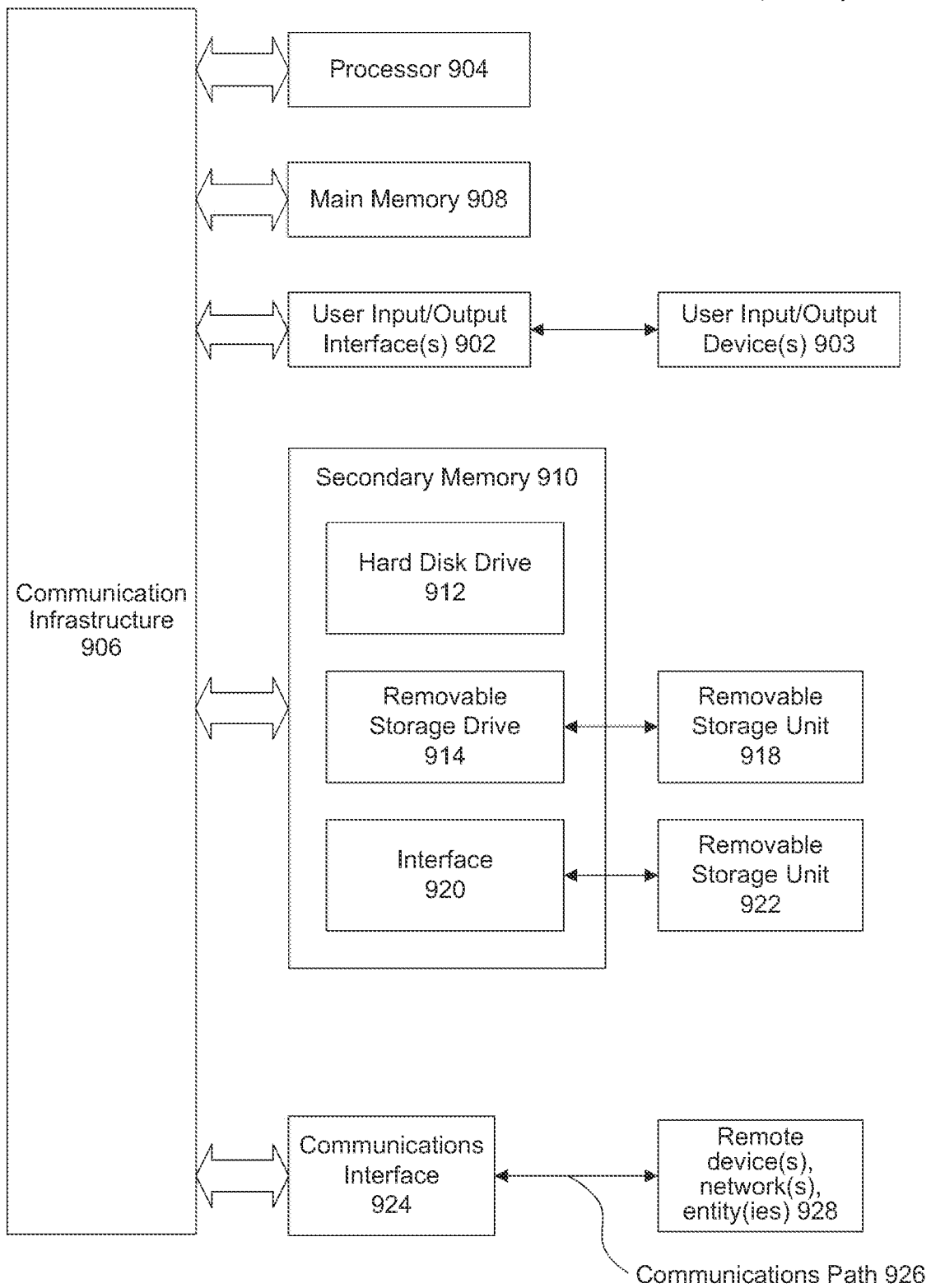
FIG. 9 is an illustration of a computer architecture of a system for a processing node, according to some embodiments.

Various aspects of the exemplary embodiments may be implemented in software, firmware, hardware, or a combination thereof. FIG. 9 is an illustration of an example computer system 900 in which embodiments of the present disclosure, or portions thereof, can be implemented as computer-readable code. Various embodiments of the present disclosure are described in terms of this example computer system 900. For example, the computer system, controller or a channel control module controller of a processing node of FIGS. 1 to 7 can be incorporated as an embodiment of computer system 900.

Computer system 900 includes one or more processors, such as processor 904. Processor 904 is connected to a communication infrastructure 906 (e.g., a bus or network).

Computer system 900 also includes a main memory 908, such as random access memory (RAM), and may also include a secondary memory 910. Secondary memory 910 can include, for example, a hard disk drive 912, a removable storage drive 914, and/or a memory stick. Removable storage drive 914 can include a floppy disk drive, a magnetic tape drive, an optical disk drive, a flash memory, or the like. Removable storage drive 914 reads from and/or writes to a removable storage unit 918 in a well-known manner. Removable storage unit 918 can include a floppy disk, magnetic tape, optical disk, flash drive, etc., which is read by and written to by removable storage drive 914. Removable storage unit 918 includes a computer-readable storage medium having stored therein computer software and/or data. Computer system 900 includes a display interface 902 (which can include input and output devices 903, such as keyboards, mice, etc.) that forwards graphics, text, and other data from communication infrastructure 906 (or from a frame buffer not shown).

In alternative implementations, secondary memory 910 can include other similar devices for allowing computer programs or other instructions to be loaded into computer system 900. Such devices can include, for example, a removable storage unit 922 and an interface 920. Examples of such devices include a program cartridge and cartridge interface (such as those found in video game devices), a removable memory chip (e.g., EPROM or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Communications interface 924 can include a modem, a network interface (such as an Ethernet card), a communications port, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and can be implemented using wire or cable, fiber optics, a phone line, a cellular phone link, a RF link, or other communications channels.

In this document, the terms "computer program storage medium" and "computer-readable storage medium" are used to generally refer to non-transitory media such as removable storage unit 918, removable storage unit 922, and a hard disk installed in hard disk drive 912. Computer program storage medium and computer-readable storage medium can also refer to memories, such as main memory 908 and secondary memory 910, which can be semiconductor memories (e.g., DRAMs, etc.). Embodiments of the present disclosure can employ any computer-readable medium, known now or in the future. Examples of computer-readable storage media include, but are not limited to, non-transitory primary storage devices (e.g., any type of random access memory), and non-transitory secondary storage devices (e.g., hard drives, floppy disks, CD ROMS, ZIP disks, tapes, magnetic storage devices, optical storage devices, MEMS, nanotechnological storage devices, etc.).

These computer program products provide software to computer system 900. Embodiments of the present disclosure are also directed to computer program products including software stored on any computer-readable storage medium. Such software, when executed in one or more data processing devices, causes a data processing device(s) to operate as described herein.

Computer programs (also referred to herein as "computer control logic") are stored in main memory 908 and/or secondary memory 910. Computer programs may also be received via communications interface 924. Such computer programs, when executed, enable computer system 900 to implement various embodiments of the present disclosure. In particular, the computer programs, when executed, enable processor 904 to implement processes of embodiments of the present disclosure, such as the operations in the method illustrated in FIG. 8. Where embodiments of the present disclosure are implemented using software, the software can be stored in a computer program product and loaded into computer system 900 using removable storage drive 914, interface 920, hard drive 912, or communications interface 924.

The functions/operations in the preceding embodiments can be implemented in a wide variety of configurations and architectures. Therefore, some or all of the operations in the preceding embodiments e.g., the functions of a communications mesh 100 described in FIGS. 1 to 7 and the method/process described in FIG. 8—can be performed in hardware, in software or both. In some embodiments, a tangible apparatus or article of manufacture including a tangible computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein. For example, the hardware/equipment can be connected to or be part of element 928 (remote device(s), network(s), entity (ies) 928) of computer system 900.

According to some embodiments, a device includes multiple channels and multiple processing nodes. Each processing node includes multiple I/O ports coupled to the multiple channels and multiple channel control modules coupled to the multiple I/O ports. Each processing node is configured to: select, by the channel control module in a first operation, a first I/O port from the multiple I/O ports; communicate a first message, via the first I/O port, to a first processing node from the multiple processing nodes over a first channel from the multiple channels or a second processing node from the multiple processing nodes over a second channel from the multiple channels orthogonal to the first channel in a logic representation; select, by the channel control module in a second operation, a second I/O port from the multiple I/O ports; and communicate a second message, via the second I/O port, to a third processing node from the multiple processing nodes over a third channel from the multiple channels extending in a diagonal direction and non-orthogonal to the first and second channels in the logic representation.

According to some embodiments, methods are provided including one or more operations: selecting a first input/output (I/O) port; communicating a first message, via the first I/O port, to a first processing node over a first channel or a second channel orthogonal to the first channel in a logic representation; selecting a second I/O port; and communicating a second message, via the second I/O port, to a second processing node over a third channel extending in a non-orthogonal direction relative to the first and second channels in the logic representation.

According to some embodiments, a system is provided. The system can include a multiple channels. The multiple channels include a first channel extending in a first direction; a second channel orthogonal to the first channel in a logic representation; and a third channel extending in a third direction non-orthogonal to the first channel and non-orthogonal to the third channel.

The system further includes a processing node that includes a first input/output (I/O) port, a second I/O port, and a third I/O port, where the first to third I/O ports are coupled, respectively, to the first, second, and third channels; and at least one channel control module coupled to the first, second, and third I/O ports. Each channel control module is configured to: select, by the channel control module in a first operation, the first I/O port; communicate a first message, via the first I/O port, to a first processing node over the first channel or the second channel; select, by the channel control module in a second operation, the second I/O port; and communicate a second message, via the second I/O port, to a second processing node over the third channel.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A device, comprising:
a plurality of channels; and
a plurality of processing nodes comprising terminal processing nodes, wherein each processing node is connected to at least two vertical channels and two horizontal channels and at least four diagonal channels non-orthogonal to the horizontal and vertical channels, wherein each terminal processing node of the plurality of processing nodes is connected by a respective channel to a terminal processing node on an opposing edge,
wherein each processing node of the plurality of processing nodes is configured to communicate with each of the other plurality of processing nodes within a maximum of two hops, and
wherein each processing node comprises:
a plurality of input/output (I/O) ports coupled to the plurality of channels; and
a plurality of channel control modules coupled to the plurality of I/O ports, and
wherein each processing node is configured to:
select, by the channel control module in a first operation, a first I/O port from the plurality of I/O ports;
communicate a first message, via the first I/O port, to a first processing node over a first channel or to a second processing node over a second channel orthogonal to the first channel;
select, by the channel control module in a second operation, a second I/O port from the plurality of I/O ports; and
communicate a second message, via the second I/O port, to a third processing node over a third channel extending in a diagonal direction that is non-orthogonal to the first and second channels.

2. The device of claim 1, wherein the plurality of I/O ports comprises at least eight input ports and eight output ports.

3. The device of claim 1, wherein the plurality of channels comprises:
a first routing mesh comprising the first channel and extending in a horizontal direction;
a second routing mesh comprising the second channel and extending in a vertical direction; and
a third routing mesh comprising the third channel and extending in the diagonal direction.

4. The device of claim 1, wherein:
the plurality of channels comprises m channels, m being an integer greater than or equal to eight, and
an $m^{th}$ channel extends in a non-orthogonal direction relative to a direction of an $(m+1)^{th}$ channel.

5. The device of claim 1, wherein at least one processing node of the plurality of processing nodes is arranged in a diagonal ring-route mesh network.

6. The device of claim 1, wherein the plurality of processing nodes further comprise at least one non-diagonal processing node, wherein the non-diagonal processing node is coupled to the first channel or the second channel, and wherein the non-diagonal processing node is not coupled to the third channel.

7. The device of claim 1, wherein a length of the third channel is less than three times that of the first or second channel.

8. A method, comprising:
selecting a first input/output (I/O) port and a second I/O port from a plurality of I/O ports; and
transmitting a communication from a processing node to another processing node of a plurality of processing nodes within a maximum of two hops, wherein each processing node of the plurality of processing nodes is connected to at least two vertical channels and two horizontal channels and at least four diagonal channels non-orthogonal to the horizontal and vertical channels, and wherein each terminal processing node of the plurality of processing nodes is connected by a respective channel to a terminal processing node on an opposing edge, and
wherein transmitting the communication comprises:
communicating a first message, via the first I/O port, to a first processing node over a first channel or to a second processing node over a second channel orthogonal to the first channel; and
communicating a second message, via the second I/O port, to a third terminal processing node on an opposing edge over a third channel extending in a diagonal direction that is a non-orthogonal direction relative to the first and second channels.

9. The method of claim 8, further comprising:
receiving a third message via one of the first channel or the second channel, wherein the first and second channels are arranged for unidirectional communication in a diagonal ring-route mesh network, and wherein communicating the first message comprises transmitting the first message via one of the first channel or the second channel.

10. The method of claim 8, wherein:
the first channel is arranged to extend in a horizontal direction;
the second channel is arranged to extend in a vertical direction; and
the third channel is arranged to extend in the diagonal direction.

11. The method of claim 8, wherein:
selecting the first I/O port comprises selecting the first I/O port from a plurality of I/O ports coupled respectively to a plurality of channels greater than or equal to m channels, wherein m is eight,
selecting the second I/O port comprises selecting the second I/O port from the plurality of I/O ports, and
the $m^{th}$ channel extends in the non-orthogonal direction relative to a direction of an $(m+1)^{th}$ channel.

12. The method of claim 8, wherein communicating the second message comprises communicating with a router of the second processing node, and wherein the second processing node is arranged in a diagonal ring-route mesh network.

13. The method of claim 8, wherein communicating the first message comprises communicating with a router of the first processing node, and wherein the first processing node is not coupled to a channel extending in the diagonal direction.

14. The method of claim 8, wherein a length of the third channel is less than three times that of the first or second channel.

15. A system, comprising:
- a plurality of channels, comprising:
  - a first channel extending in a first direction;
  - a second channel extending in a second direction orthogonal to the first channel; and
  - a third channel extending in a third direction non-orthogonal to the first channel and non-orthogonal to the second channel; and
- a plurality of processing nodes, wherein each processing node is connected to two vertical channels and two horizontal channels and at least four diagonal channels non-orthogonal to the horizontal and vertical channels, and wherein the plurality of processing nodes comprise:
  - a plurality of terminal processing nodes wherein each terminal processing node is connected by a respective channel to a terminal processing node on an opposing edge, wherein each processing node of the plurality of processing nodes is configured to communicate with each of the other plurality of processing nodes within a maximum of two processing nodes, and
  - wherein each processing node comprises:
    - a plurality of input/output ports, comprising;
    - a first input/output (I/O) port;
    - a second I/O port; and
    - a third I/O port, wherein the first, second, and third I/O ports are coupled, respectively, to the first, second, and third channels; and
  - at least one channel control module coupled to the first to third I/O ports, wherein each channel control module is configured to:
    - select, by the channel control module in a first operation, a first I/O port from the plurality of I/O ports;
    - communicate a first message, via the first I/O port, to a first processing node over the first channel or to a second processing node over the second channel;
    - select, by the channel control module in a second operation, a second I/O port from the plurality of I/O ports; and
    - communicate a second message, via the second I/O port, to a third processing node over the third channel.

16. The system of claim 15, wherein the plurality of I/O ports comprises at least eight input ports and eight output ports.

17. The system of claim 15, wherein the plurality of channels comprises: a first routing mesh comprising the first channel and extending in a horizontal direction; a second routing mesh comprising the second channel and extending in a vertical direction; and a third routing mesh comprising the third channel and extending in a diagonal direction.

18. The system of claim 15, wherein the plurality of channels comprises m channels, the m channels comprising the first, second, and third channels, m being an integer greater than or equal to eight, the $m^{th}$ channel extends in a non-orthogonal direction relative to a direction of the $(m+1)^{th}$ channel.

19. The system of claim 15, wherein:
- the first and second channels are arranged for unidirectional communication in a diagonal ring-route mesh network,
- the channel control module is configured to communicate the first message by transmitting the first message via one of the first channel or the second channel, and
- the channel control module is configured to receive a third message in a via one of the first channel or the second channel.

20. The system of claim 15, wherein the channel control module is configured to couple the processing node to a non-diagonal processing node, wherein the non-diagonal processing node is coupled to the first channel or the second channel, and wherein the non-diagonal processing node is not coupled to a channel extending in a diagonal direction.

* * * * *